ABSTRACT

United States Patent [19]

Campbell et al.

[11] 4,025,602
[45] May 24, 1977

[54] RECOVERY OF TRANSPLUTONIUM ELEMENTS FROM NUCLEAR REACTOR WASTE

[75] Inventors: David O. Campbell, Oak Ridge; Samuel R. Buxton, Wartburg, both of Tenn.

[73] Assignee: The United States of America as represented by The United States Energy Research and Development Administration, Washington, D.C.

[22] Filed: May 25, 1976

[21] Appl. No.: 689,888

[52] U.S. Cl. .................................... 423/7; 423/11; 252/301.1 R
[51] Int. Cl.[2] ...................................... C01G 56/00
[58] Field of Search ........... 423/7, 11; 252/301.1 R

[56] References Cited

UNITED STATES PATENTS

| | | | |
|---|---|---|---|
| 3,104,940 | 9/1963 | Bril et al. | 423/11 X |
| 3,328,133 | 6/1967 | Ishihara et al. | 423/11 X |
| 3,781,404 | 12/1973 | Conner et al. | 423/11 |
| 3,922,231 | 11/1975 | Carlin et al. | 423/7 X |

OTHER PUBLICATIONS

Nuclear Science Abstracts, 23, 15956, Nozaki, et al.
Nuclear Science Abstracts, 21, 19742, Krawezyk-Obojska.

Primary Examiner—Richard E. Schafer
Assistant Examiner—E. Suzanne Parr
Attorney, Agent, or Firm—Dean E. Carlson; David S. Zachry; Allen H. Uzzell

[57] ABSTRACT

A method of separating actinide values from nitric acid waste solutions resulting from reprocessing of irradiated nuclear fuels comprises oxalate precipitation of the major portion of actinide and lanthanide values to provide a trivalent fraction suitable for subsequent actinide/lanthanide partition, exchange of actinide and lanthanide values in the supernate onto a suitable cation exchange resin to provide an intermediate-lived raffinate waste stream substantially free of actinides, and elution of the actinide values from the exchange resin. The eluate is then used to dissolve the trivalent oxalate fraction prior to actinide/lanthanide partition or may be combined with the reprocessing waste stream and recycled.

5 Claims, 2 Drawing Figures

RECOVERY OF TRANSPLUTONIUM ELEMENTS FROM NUCLEAR REACTOR WASTE

BACKGROUND OF THE INVENTION

This invention was made in the course of, or under, a contract with the Energy Research and Development Administration.

It relates in general to the treatment of wastes from the reprocessing of irradiated nuclear fuels and more particularly to the separation of long-lived actinides prior to ultimate waste disposal.

In the art of nuclear fuel reprocessing, irradiated fuel is periodically withdrawn from the reactor and reprocessed to remove fission and corrosion products and to recover uranium, plutonium, and sometimes neptunium values. Typical of such reprocessing processes in the "Purex" process involving dissolution of spent fuel in nitric acid and extraction of uranium and plutonium values into an organic phase comprising tri-n-butyl phosphate. The waste from the Purex processes as well as from other solvent extraction processes such as the "25" process and the Hexone process comprises a nitric acid solution containing about thirty metal element values including corrosion products such as iron and nickel; fission products such as the lanthanides, zirconium, ruthenium and other transition metals; and actinides such as americium, curium and trace amounts of plutonium and transcurium elements. This complex solution is normally referred to as fission product waste solution and must undergo concentration and solidification prior to ultimate storage underground. The Purex process and other nuclear fuel reprocessing processes producing waste suitable for the practice of this invention are more fully described in *Engineering For Nuclear Fuel Reprocessing*, Justin T. Long, Gordon and Breach Science Publishers, New York, London and Paris (1967) pp. 162–236 which is herein incorporated by reference.

Because of their long half-lives and high toxicity, it is desirable to remove actinides from fission product waste prior to underground disposal. When actinides values are removed from fission product waste solution prior to solidification and underground storage, the biological lifetime is significantly decreased and the toxicity of the waste after a few hundred years is reduced by a factor of over 200. Such wastes would then be classified as intermedite-lived waste having a lifetime of about 500 to 1000 years.

Current waste management proposals involve separating long-lived actinides such as americium, curium and transcurium elements from reprocessing waste for separate management; for example, fabricating the actinides into fuel for recycle to the reactor and conversion to fission products. Such proposals require a waste partitioning process capable of providing an actinide waste product of high purity and an intermediate-lived waste product containing fission products and substantially free of actinides. Such a waste partitioning process must accomplish these objectives without the addition of materials which add to the quantity of the waste.

Processes proposed for the recovery of actinides from reactor fuel reprocessing waste involve two partitioning steps: a first partitioning step to provide a trivalent fraction enriched in actinide and lanthanide values (i.e., the actinide/lanthanide content represents a greater portion of total metal value content than in the originally waste) and a first waste product substantially free of actinides; and an actinide/lanthanide partitioning step in which the trivalent fraction is partitioned to provide an actinide waste product with only a minimal amount of other metal impurities and a second waste product substantially free of actinides.

This invention relates to the first partitioning step. Actinide/lanthanide partitioning steps suitable for use with our method are known in the prior art. An example of such an actinide/lanthanide partitioning step is the so-called "Talspeak" process involving first contacting an actinide/lanthanide (trivalent fraction) solution with an aminopolycarboxylic acid and a water soluble organic acid and then contacting the resulting aqueous solution with a disubstituted phosphoric acid in an organic phase whereby actinides preferentially distribute to the organic phase. The Talspeak process is more fully described in commonly assigned U.S. Pat. No. 3,230,036 to Frederick A. Kappelmann, et al., Jan. 18, 1966, for "Method for Separating Americium and Curium from the Lanthanide Rare Earths and Yttrium," which is herein incorporated by reference. Another proposed method for separating actinides from rare earths is ion exchange chromatography involving chromatographic elution of metal values from a $Zn^{++}$ loaded cation exchange column with a complexing agent such as sodium diethylenetriaminepentaacetate. In our process, yttrium and scandium behave similarly and follow the members of the lanthanide family. For purposes of this disclosure the terms "lanthanides" and "rare earths" are used synonymously and include yttrium, scandium and members of the lanthanide family.

Several methods for the first step partitioning to provide a trivalent fraction and a first waste product subtantially free of actinides are available in the prior art. Two such processes are described in *Chem. Technol. Div. Annual Progr. Rep.*, ORNL-5050, Oak Ridge National Laboratory, Oak Ridge, Tenn. (Oct., 1975) available from the National Technical Information Service, U.S. Dept. of Commerce, Springfield, Va., which report also contains our first publication of this invention. One of the prior art methods (p. 30) involves oxalate precipitation of actinides and rare earths followed by Talspeak partitioning. Because actinide and lanthanide oxalates are slightly soluble in nitric acid solutions, the precipitation was not quantitative. In order for this process to be effective for providing an intermediate-lived waste stream substantially free of actinides, the initial oxalate precipitation must be followed up by successive scavenging precipitations with excess rare earths to remove most of the remaining actinide values, thereby adding to the quantity of the waste. An additional disadvantage to this oxalate precipitation is the requirement for complete separation of the solid precipitate from the supernate. This is a particularly troublesome problem in high level waste streams where emissions from radioisotopes cause oxalate crystallites to fracture into smaller particles making recovery more difficult. Due to serious problems associated with the remote handling of radioactive solids, such radiochemical separations requiring the quantitative precipitation of radioactive species and complete recovery of the precipitate from the supernate are generally considered infeasible for plant-scale operations.

A prior art proposal (ORNL-5050, p. 9) which avoids the handling of radioactive solids is cation exchange followed by selective elution chromatography. In this proposed method, trivalent elements and most of the other metal values are loaded onto a strong acid cation exchange resin from a 1 M $HNO_3$ waste solution and trivalents (actinides and lanthanides) are selectively eluted with 3.5 M $HNO_3$. The chief difficulty is that ion exchange capacity is required for large quantities of actinides, lanthanides and other fission products as well as corrosion products. Furthermore, the resin cannot be loaded to capacity because radiation damage tends to break down the resin and cause column failure. In addition, some radioactive metal values, such as zirconium precipitate onto the bed complicating the ultimate disposal of spent resin. Another difficulty with the ion exchange process is that certain metal values, particularly Fe, Ni and Al (corrosion products) tend to follow the actinides and lanthanides through the column and interfere with the subsequent actinide/lanthanide partition. In another prior art process, described in *Ion Exchange Technology;* Nachod, F. C. and Schubert, J; Academic Press, Inc. (New York) 1956; pp. 408–410, an aluminum nitrate salt containing fission products is dissolved and treated with $Fe_2O_3$—$MnO_2$ to precipitate the bulk of Ru, Zr and Nb values and then the supernate is made 0.016 M in oxalic acid and passed through a Dowex-50 resin column. The small amount of oxalate present complexed the remaining Ru, Zr and Nb values which passed through the column. Al and the fission products were adsorbed onto the column. Al was eluted with 0.4 M oxalic acid and the remaining fission products with 6 M $HNO_3$. The disadvantages of this process are that there is insufficient oxalate available prior to ion exchange to precipitate rare earths and actinides and complex Al and fission products, hence ion exchange sites must be provided for large quantities of these values.

SUMMARY OF THE INVENTION

Figure 1:
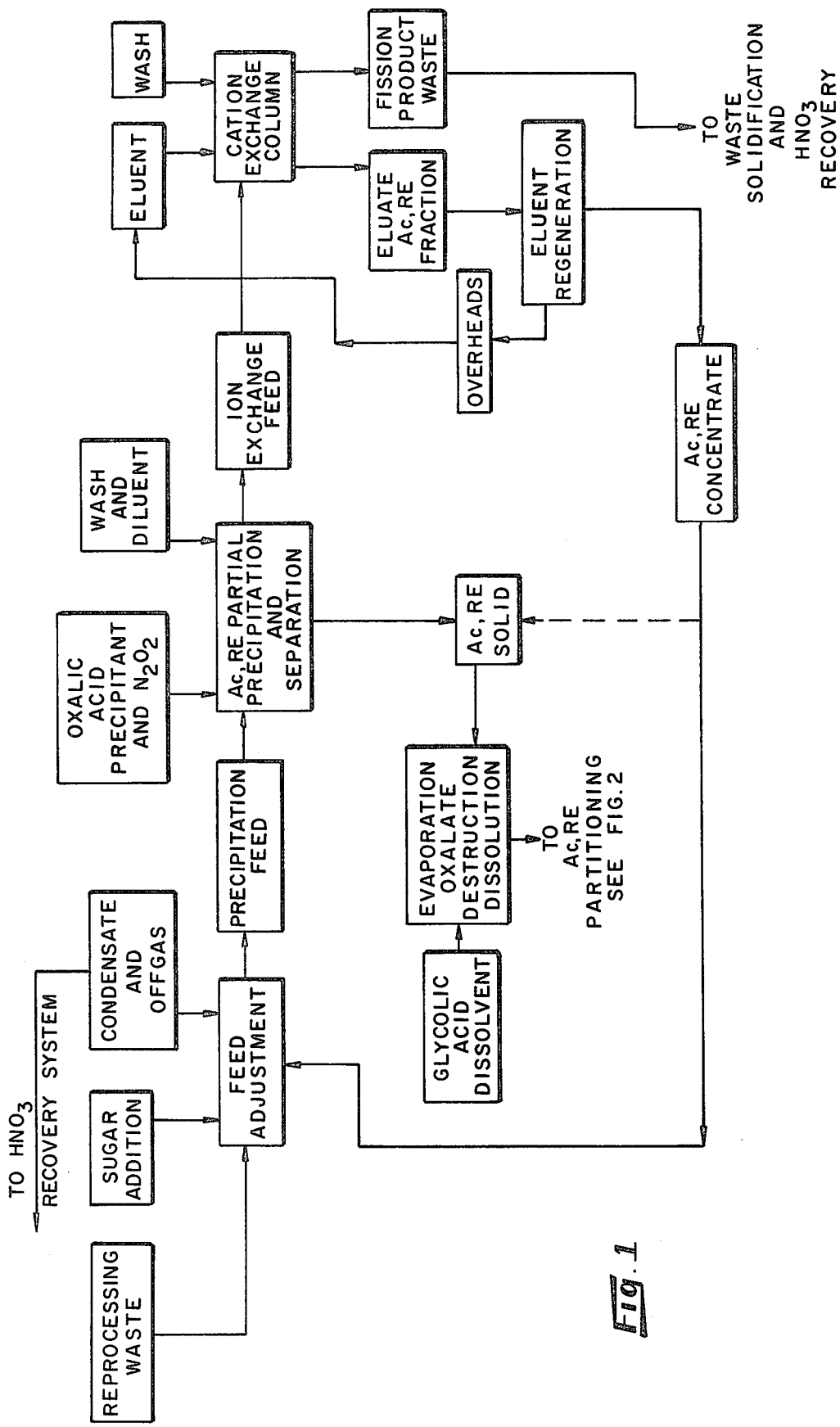
FIG. 1 is a flow sheet of an embodiment of the method of our invention in a first partitioning step.

It is an object of this invention to provide a method for separating actinide values from nitric acid fission product waste solution which method does not require the quantitative precipitation of radioactive solids.

It is a further object to provide a method which does not require complete separation of radioactive solids from a supernate.

It is a further object to provide a method which substantially reduces the ion exchange capacity required in the prior art to provide an intermediate-lived waste stream substantially free of actinide values.

It is a further object to provide a method which substantially reduces the precipitation of radioactive material onto the cation exchange resin.

It is a further object to provide a method which reduces the level of impurities in actinide/lanthanide eluate from the column, thereby reducing the impurities in the final product.

These and other objects are accomplished according to this invention: In a two step process for separating actinide values from a nitric acid nuclear fuel reprocessing waste stream containing actinide values, lanthanide values, and other metal values; comprising a first partitioning step to provide a trivalent fraction enriched in actinide and lanthanide values and a first waste product substantially free of actinide values, and an actinide/lanthanide partitioning step in which said trivalent fraction is partitioned to provide an actinide waste product and a second waste product substantially free of actinides; the improvement wherein said first partitioning step comprises: adjusting the nitric acid concentration of said reprocessing waste to about 0.1–1.0 M; in a precipitation zone, contacting said reprocessing waste with an excess of a source of oxalate ions to cause a major portion of said actinide and lanthanide values to precipitate as solid oxalates providing a supernate solution of the remaining actinide and lanthanide values and the major portion of said other metal values in the presence of dissolved oxalate; separating oxalate precipitate from said precipitation zone to provide a trivalent fraction for said actinide/lanthanide partitioning step; contacting the supernate solution with a sufficient quantity of strong acid ion exchange resin to cause the loading of actinide and lanthanide values onto said resin, providing a raffinate substantially free of actinides; and eluting actinide and lanthanide values from the loaded resin with 3 to 6 M $HNO_3$ to provide an eluate solution enriched in actinide and lanthanide values.

The eluate stream may be concentrated and actinide and lanthanide values therein may be combined with the trivalent fraction prior to the actinide/lanthanide partitioning step. Alternatively, actinide and lanthanide values from the eluate can be combined with additional reprocessing waste for recycle. One embodiment of our method involves the addition of a complexant such as nitrogen oxides, soluble nitrite, hydroxylamine, etc., to the reprocessing waste to cause the complexation of ruthenium values prior to oxalate precipitation.

Detailed Decription

According to our invention, actinide values are recovered from a nitric acid solution containing actinide values, lanthanide values, and other metal values (such as high-level fission product waste from solvent extraction reprocessing of reactor fuels) in a two step process. In a first partitioning step, reprocessing waste (typically about 2–4 M $HNO_3$) is treated to adjust the nitric acid concentration to about 0.1 M to 1.0 M and contacted with an excess of a source of oxalate ions. Oxalate addition may be before or after nitric acid concentration adjustment. Under these conditions, a major portion (usually greater than 90%) of actinide and lanthanide values precipitate as solid oxalates providing a supernate solution of the remaining actinide and lanthanide values and the major portion of said other metal values in the presence of dissolved oxalate. The oxalate precipitate is then separated from the supernate by any conventional means such as vacuum filtration, centrifugation, etc.

Prior to the precipitation step, it is sometimes necessary that a complexant be added to the waste to complex ruthenium values which tend to interfere in subsequent waste partitioning. Suitable complexants are known and include nitrogen oxides, soluble nitrite, nitrous acid and hydroxylamine. In some high level waste solutions ruthenium is complexed by radiolysis products and complexants are not needed.

The nitric acid concentration may be adjusted by conventional means such as dilution with water or adding a compound such as sucrose or formic acid which decomposes nitric acid, i.e., one mole of sucrose decomposes 48 moles of nitric acid. While lower nitric acid concentration enhance the precipitations and subsequent resin loading, 0.5–1.0 M is the preferred range for industrial applications for both the precipitation step and the ion exchange step to reduce the need for dilution or nitrate destruction. Above about 1.0 M resin loading becomes markedly less efficient. The source of oxalate ions may be any compound which yields oxalate ions in the solution such as any oxalate salt, oxalate ester, or oxalic acid. Oxalic acid is preferred to avoid extraneous ions. In our process, oxalate functions as a precipitant for actinides and rare earths and as a complexant for other metal values in the feed, so an excess with respect to all the metal values should be added. This amount may be routinely determined for a particular waste as that amount which is sufficient to maximize the solid oxalate recovery and minimize the loading of values other than actinides and lanthanides on the column in the subsequent step.

After the oxalate precipitate is separated, the supernate is contacted with a strong acid cation exchange resin, i.e., in a conventional column, to cause the loading of actinide and lanthanide values onto the resin. The previous solid/liquid separation need not be complete since some solid oxalate can be tolerated in the ion exchange step. The $HNO_3$ concentration requirement for the ion exchange step is substantially the same as for the oxalate precipitation; about 0.1–1 M with 0.5–1 M preferred for similar reasons. The raffinate from the ion exchange step is substantially free of actinides and is suitable for subsequent solidification such as evaporation and encasement in concrete. By "substantially free of actinides" it is meant less than about 0.1% by weight of the original actinide content of the reprocessing waste. Of course, the lower the actinide content in the raffinate the better. After separating the ion exchange raffinate from the column, the column is then eluted with about 3 to 6 M $HNO_3$ to elute actinide and lanthanide values from the column, forming an eluate which may be concentrated to recover $HNO_3$ and recycled to the reprocessing waste or combined with the separated oxalate precipitate (trivalent fraction) prior to the second step actinide/lanthanide partition. At least about 3 M is needed for efficient elution and greater than about 6 M causes resin instability.

For the ion exchange step, the resin is in the $H^+$ form. Suitable cation exchange resins are any strong acid resin, such as sulphonic acid resin, which is resistant to radiation damage. Typical of such resins are the sulphonated cross-linked polystyrene resins. Such resins are readily available commercially or may be prepared by well-known techniques of copolymerization of styrene and divinylbenzene followed by sulphonation with sulphuric acid. A suitable laboratory-scale synthesis is found in *Synthetic Ion Exchangers*, G. H. Osborn, Chapman and Hall Ltd., London (1961) pp. 2–3, which is herein incorporated by reference. Suitable commercially available resins are Dowex-50 X-8, or X-12 available from Dow Chemical Company. The resin particle size is not critical but the finer beads such as 100 to 200 mesh are preferred to efficiently trap small amounts of insoluble oxalates which are in the precipitation raffinate.

After separation from the supernate of the precipitation step, the solid oxalate precipitate is treated to provide a suitable feed for the subsequent actinide/lanthanide partitioning step. For example, for Talspeak partition, the precipitate is contacted with strong refluxing nitric acid (12 M), for example, concentrated from the ion exchange eluate, to destroy oxalate and is dissolved in glycolic acid.

An important aspect of our process is the behaviour of oxalate ion in the precipitation and ion exchange steps. While it is known that oxalate ion precipitates actinides and rare earths from acid solutions and complexes zirconium, iron and other metal ions, the fact that nearly all of the lanthanide and actinide values in the ion exchange feed loaded onto the resin was surprising. Since the ion exchange feed was the supernate from an incomplete oxalate precipitation, one would ordinarily expect the actinides and lanthanides to be complexed and pass through the resin along with the other metal values. By controlling the nitric acid concentration of the ion exchange feed according to our invention, the loading of competing ions is controlled and the column is made selective for actinides and rare earths. The precipitation and ion exchange steps in our process are carried out in the presence of excess oxalate. The oxalate concentration in the ion exchange feed is not critical so long as sufficient oxalate is present to complex metal values other than lanthanides and actinides. The desired excess of oxalate is that amount which results in reasonable recovery of solid precipitate and can readily be determined for a particular waste solution by routine experimentation. For example, the stoichiometric amount of oxalate required for exhaustive extraction waste from light water reactor fuel based on a burn-up of 30,000 MW days/metric ton is about 0.06 M. To ensure optimum solids recovery and resin loading an oxalate concentration of greater than about 0.1 M would be adequate.

The particular advantages of our process over prior art actinide removal processes are several. Our process requires no quantitative precipitation of radioactive material since the unprecipitated actinide values are recovered in the ion exchange step. Our process does not require the complete separation of the oxalate precipitate from the supernatant liquid since remaining solids are trapped in the column and dissolved during the elution step. Our process greatly reduces the ion exchange capacity needed, since the bulk of actinide and lanthanide values is removed in the precipitation step and most of the remaining metal values are complexed by oxalate and pass through the column. This greatly reduces the radiolytic heat generated in the column and prolongs the useful life of the column. In our process, zirconium values are complexed during the ion exchange and do not precipitate onto the bed. In our process, iron, nickel, and molybdenum are efficiently separated from the trivalent fraction and do not interfere in subsequent actinide/lanthanide partitioning and do not appear in the concentrated actinide product as impurities. An additional advantage in our process is that the precipitation process is the mainstream actinide recovery process with the ion exchange serving to remove only minor amounts of actinides. In this manner, if the ion exchange process should break down due to column failure, the reprocessing plant could continue to operate with the precipitation raffinate being combined with the reprocessing waste and recycled.

In order to show the effectiveness of partial oxalate precipitation coupled with cation exchange of the supernate for recovering actinide values, the following experimental demonstration is presented. The experimental demonstration was carried out with a simulated synthetic waste stream (non-radioactive) representing the fission product concentration in fuel reprocessing (Purex) waste from 1 metric ton of light water fuel in 3100 liters 2 M $HNO_3$. While there are no actinides present in this simulated waste, actinides follow the lanthanides through the first partitioning step of our process and lanthanide recovery is directly correlatable to actinide recovery. The composition of the simulated waste is as follows:

Table 1

| Element | Millimoles/liter | Element | Millimoles/liter |
|---|---|---|---|
| Rb | 1.25 | Ag | 0.18 |
| Cs | 5.87 | | |
| | | Cd | 0.24 |
| Sr | 3.00 | | |
| Ba | 3.90 | In | 0.0035 |
| Y | 1.69 | Ge | 0.0016 |
| La | 2.95 | Sn | 0.13 |
| Ce | 5.68 | | |
| Pr | 2.74 | As | 0.0004 |
| Nd | 9.16 | Sb | 0.032 |
| Sm | 1.90 | | |
| Eu | 0.36 | Se | 0.21 |
| Gd | 0.24 | Te | 1.42 |
| Tb | 0.0036 | | |
| Dy | 0.0022 | Br | 0.06 |
| | | I | 0.67 |
| Zr | 12.9 | | |
| Mo | 11.4 | Ru | 6.81 |
| | | Rh | 1.22 |
| | | Pd | 4.29 |

To 50 ml. of synthetic waste solution were added 5 ml. of 0.5 M $NaNO_2$ to complex Ru values, 25 ml. of 0.8 M oxalic acid, and water to give a total volume of 200 ml. (approximately 0.5 M $HNO_3$). The slurry was stirred for 1 hour, allowed to settle for about 1 hour and the supernate was decanted. The precipitate was washed twice with 10 ml. of 0.1 M oxalic acid and the wash solution decanted and combined with the supernate. One ml. conc. $HNO_3$ was added to raise the $HNO_3$ concentration to about 0.55 M. The solution was pumped through a column containing 0.75 ml. of Dowex 50-X-8 resin, 15-25 micrometer particle size. The raffinate from the column together with a 10 ml. $H_2O$ wash was labeled Raff. Following loading, the column was eluted first with 10 ml. 0.75 M $HNO_3$ (labeled P-1) and then with 15 ml. 4 M $HNO_3$ (labeled P-2). The oxalate precipitate was dissolved in 4 M $HNO_3$ and labeled P-Ox. The fractions were analyzed by spark source mass spectrometry and the results given in table 2 as percent of total quantity of the element found in the fraction. To correlate the values of table 2 with the steps of our invention, P-Ox represents the percentage of the component found in the solid precipitate from the precipitation zone; Raff. represents the weight percentage recovered from the ion exchange raffinate, P-1 represents the weight percentage recovered from the loaded column with one weak acid wash, and P-2 represents the weight percentage recovered from the elution step.

Table 2

| | Raff | P-1 | P-2 | P-Ox |
|---|---|---|---|---|
| Rb | 82 | 4 | <2 | 14 |
| Cs | 96 | 4 | .04 | .2 |
| Sr | 49 | 4 | 11 | 36 |
| Ba | 29 | 3 | 57 | 11 |
| Zr | 74 | .4 | 1 | 24 |
| Mo | 99 | .1 | .1 | 1 |
| Ru | 83 | 2 | 15 | <.1 |
| Rh | 23 | 5 | 70 | 5 |
| Pd | 99 | <.1 | <.1 | <.5 |
| Y | .6 | .2 | 10 | 89 |

Table 2-continued

| | Raff | P-1 | P-2 | P-Ox |
|---|---|---|---|---|
| La | <.2 | .1 | 11 | 89 |
| Ce | <.1 | .1 | 4 | 96 |
| Pr | <.1 | .1 | 3 | 97 |
| Nd | <.1 | .2 | 2 | 98 |
| Sm | <.5 | <.1 | 3 | 97 |
| Eu | <1 | <.5 | 3 | 97 |
| Gd | — | <.5 | 3 | 97 |
| Cd | 74 | 15 | 11 | — |
| In | 26 | — | — | 74 |
| Sb | 45 | — | — | 55 |
| Te | 93 | — | — | 7 |

Figure 2:
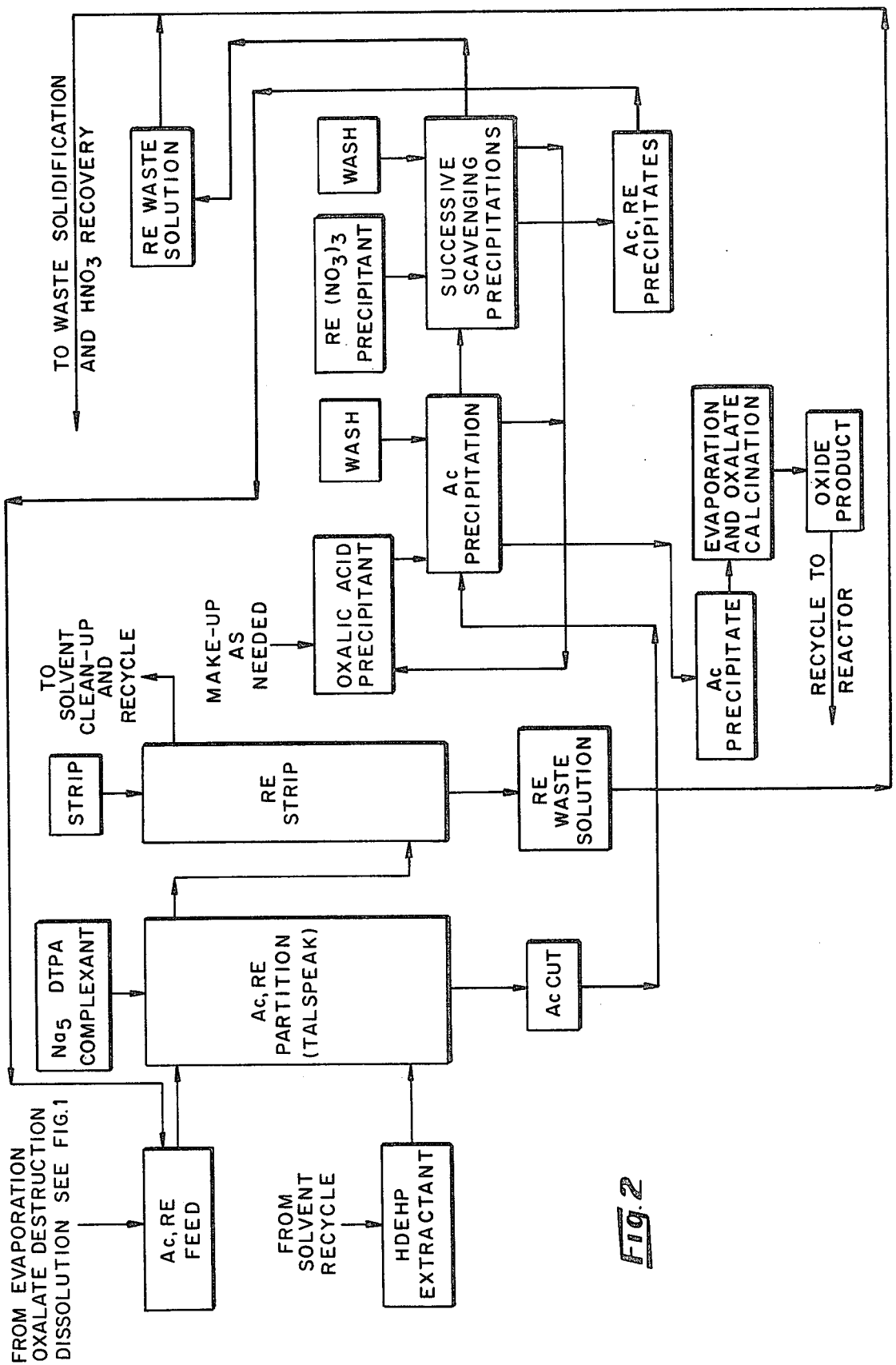
FIG. 2 is a flow sheet of a suitable Talspeak actinide/lanthanide partition for use in treating the trivalent fraction from FIG. 1.

FIGS. 1 and 2 are flow sheets showing a preferred mode of carrying out our process. FIG. 1 is an embodiment of a first partitioning step to provide a trivalent fraction enriched in actinide and lanthanide values and FIG. 2 is an embodiment of a Talspeak actinide/lanthanide partitioning step in which the trivalent fraction is partitioned to provide an actinide waste product and a second waste product substantially free of actinides. The following example is in accordance with FIGS. 1 and 2. The percentages given are by weight. The example is for illustrative purposes and is not intended to be limiting. For example, the embodiment of the Talspeak process shown may be replaced by ion exchange chromotgraphy or any other method of partitioning actinides and lanthanides.

EXAMPLE

Reprocessing waste from a Purex plant comprises 5900 liters 2.4 M $HNO_3$ containing americium and curium values (Ac); rare earth values (RE) barium and strontium values (Ba,Sr) and other fission product values (FP). This reprocessing waste is combined with sugar to decompose $HNO_3$ and is evaporated to provide a precipitation feed of 2000 liters of 2 M $HNO_3$. Off gases comprising $HNO_3$, nitrogen oxides and $CO_2$ are condensed and passed to a $HNO_3$ recovery system where it is condensed to recover $HNO_3$ and water. To the precipitation feed in a precipitation zone is added the precipitant, 750 liters of oxalic acid, 0.8 M, and $N_2O_2$ is bubbled through to complex ruthenium. In addition, 3250 liters $H_2O$ is added as a wash and diluent to provide a $HNO_3$ concentration of 0.67 M for the precipitation. Under these conditions, about 95% of the Ac, RE content precipitates as an Ac,RE solid along with about 48 percent of the Ba,Sr content. The precipitation zone should be cooled to enhance solids recovery. This Ac,RE solid is a trivalent fraction enriched in actinide and lanthanide values. The Ac,RE solid is contacted with strong refluxing nitric acid, about 12 M to destroy oxalate, evaporated, and dissolved in 1800 ; liters 1.0 M glycolic acid to provide a feed for subsequent Ac,RE partitioning.

The supernate from the partial precipitation is 6000 liters 0.67 M $HNO_3$-0.1 M in oxalate ion and contains about 5% of the original Ac,RE content, about 48% of the original Ba,Sr content, and about 100 percent of FP content and makes up the ion exchange feed. The ion exchange feed is passed through an ion exchange column containing 50 liters of Dowex-50 ion exchange resin followed by a 50 liters wash with 0.01 M $HNO_3$. It is preferred that the ion exchange step on an industrial scale be carried out at about 70° -80° C to enhance flow rates through the column and reduce pressure. The solution passing through the column is the fission product waste and constitutes a first waste product substantially free of actinides. This fission product waste consists of 6050 liters of 0.67 M $HNO_3$, containing about 0.02 percent of original Ac,RE content, about 48 percent of original Ba,Sr content, and about 100 percent of the original FP content, and is suitable for subsequent waste solidification and $HNO_3$ recovery by conventional means.

The column is then eluted with 500 liters 4 M $HNO_3$ and washed with 50 liters of 0.01 M $HNO_3$ to provide the Ac,RE fraction consisting of 550 liters 3.64 M $HNO_3$ and containing about 5 percent of the original Ac,RE content and about 4 percent of the original Ba,Sr content. The Ac,RE fraction is then evaporated partially to provide about 530 liters $HNO_3$ for solvent recycle and about 20 liters of about 14 M $HNO_3$ which may either be combined with the reprocessing waste to provide precipitation feed or combined with the recovered Ac,RE solid (indicated by the dotted line in FIG. 1) to aid in oxalate destruction. If recycled to make up the precipitation feed, the Ac,RE contents of successive fractions will be proportionately increased and if added to Ac,RE solid precipitate, the Ac,RE feed for the actinide/lanthanide partitioning will then be practically 100 percent of original Ac,RE content of the waste.

As mentioned above, the product of the glycolic acid dissolution is the Ac,RE feed for the actinide/lanthanide partitioning step shown in FIG. 2 and comprises an 1800 liters 1.0 M glycolic acid solution containing Ac,RE values and about 48 percent of the original Ba,Sr content. The Ac,RE feed is contacted with a complexant of 1800 liters of 1.0 M glycolic acid (aqueous) 0.05 M in sodium diethylenetriaminepentaacetate ($Na_5DTPA$) and the resulting solution contacted with an extractant consisting of 2700 liters di(2-ethylhexyl) phosphoric acid (HDEHP) 0.8 M in diethyl benzene. The aqueous phase is the Ac cut, and the RE content is stripped from the organic phase with about 1200 liters 6 M $HNO_3$ to provide a RE waste solution of 1200 liters 6 M $HNO_3$ containing about 99.8 percent of the RE content of the Ac,RE feed and less than 0.01 percent of the actinide content. The RE waste fraction provides a second waste fraction substantially free of actinides.

The Ac cut is 3600 liters of 1.0 M glycolic acid and contains about 99.99 percent of Ac content in Ac,RE feed, and is 0.125 M in $Na^+$. The Ac fraction is then contacted with 900 liters 0.93 M oxalic acid to precipitate about 99 percent of the Ac content to provide an Ac precipitate which is evaporated and calcined to provide an actinide waste product which is an oxide and may then be fabricated into fuel and recycled to a reactor.

The supernate from the Ac precipitation is then contacted with excess RE nitrate solution in successive scavenging precipitations to precipitate residual Ac values which are recovered and recycled to the Ac,RE feed. After at least two scavenging precipitations, the precipitation supernates are reduced in Ac content to less than about 0.001 percent of the Ac content of the feed and are suitable for waste solidification and $HNO_3$ recovery.

As shown in the preceeding example and experimental demonstration, the column capacity required per ton of reprocessed fuel is greatly decreased. The reduced loading of fission products on the column substantially decreases the quantity of interfering ions entering the actinide/lanthanide partitioning step thereby providing an ultimate actinide product reduced in metal impurities.

What is claimed is:
1. In a two step process for separating actinide values from a nitric acid nuclear fuel reprocessing waste stream containing actinide values, lanthanide values, and other metal values comprising a first partitioning step to provide a trivalent fraction enriched in actinide and lanthanide values and a first waste product substantially free of actinide values, and an actinide/lanthanide partitioning step in which said trivalent fraction is partitioned to provide an actinide waste product and a second waste product substantially free of actinides; the improvement wherein said first partitioning step comprises:
   a. adjusting the nitric acid concentration of said reprocessing waste to about 0.1–1.0 M;
   b. contacting said reprocessing waste with an excess of a source of oxalate ions to cause a major portion of said actinide and lanthanide values to precipitate as solid oxalates providing a supernate solution of the remaining actinide and lanthanide values and the major portion of said other metal values in the presence of dissolved oxalate;
   c. separating oxalate precipitate from said supernate solution to provide a trivalent fraction for said actinide/lanthanide partitioning step;
   d. contacting the supernate solution with a strong acid ion exchange resin to cause the loading of actinide and lanthanide values onto said resin, providing a raffinate substantially free of actinides; and
   e. eluting actinide and lanthanide values from the loaded resin with about 3 to 6 M $HNO_3$ to provide an eluate solution.

2. The method of claim 1 wherein actinide and lanthanide values from said eluate are combined with said trivalent fraction prior to said actinide/lanthanide partitioning step.

3. The method of claim 1 wherein actinide and lanthanide values from said eluate are combined with the reprocessing waste stream for recycle.

4. The method of claim 1 wherein prior to contacting with said source of oxalate ions, said reprocessing waste is contacted with a complexant to complex ruthenium values present in said waste.

5. The method of claim 1 wherein said nitric acid concentration of said reprocessing waste is adjusted to 0.5–1.0 M.

* * * * *